Jan. 3, 1956  G. A. LYON  2,729,508
WHEEL COVER
Filed Aug. 19, 1952  3 Sheets-Sheet 2
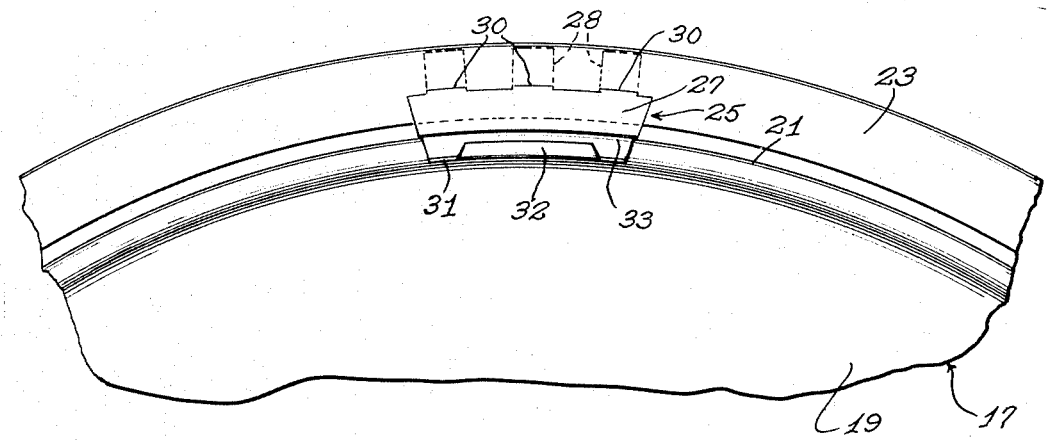
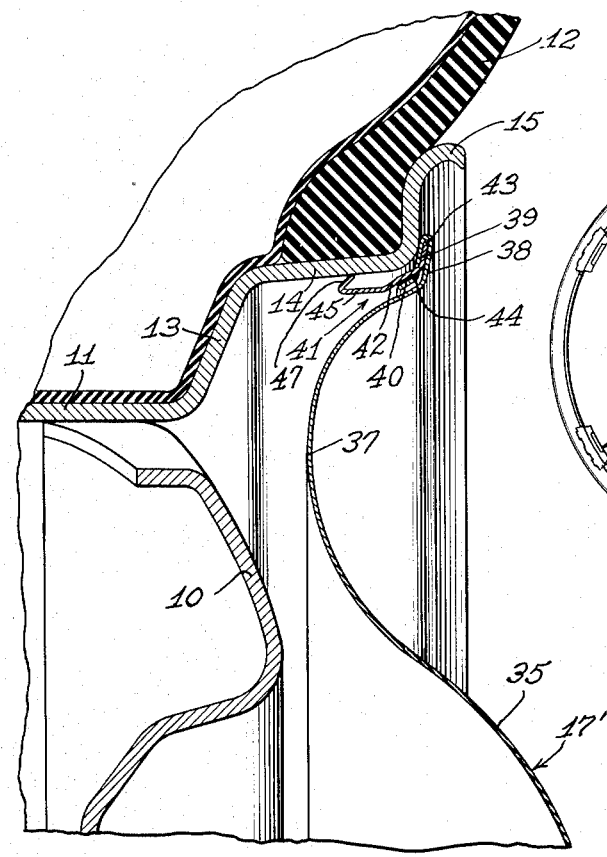
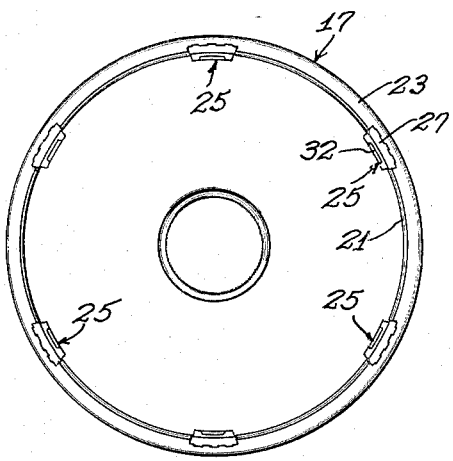
Inventor
GEORGE ALBERT LYON
by
Attys.

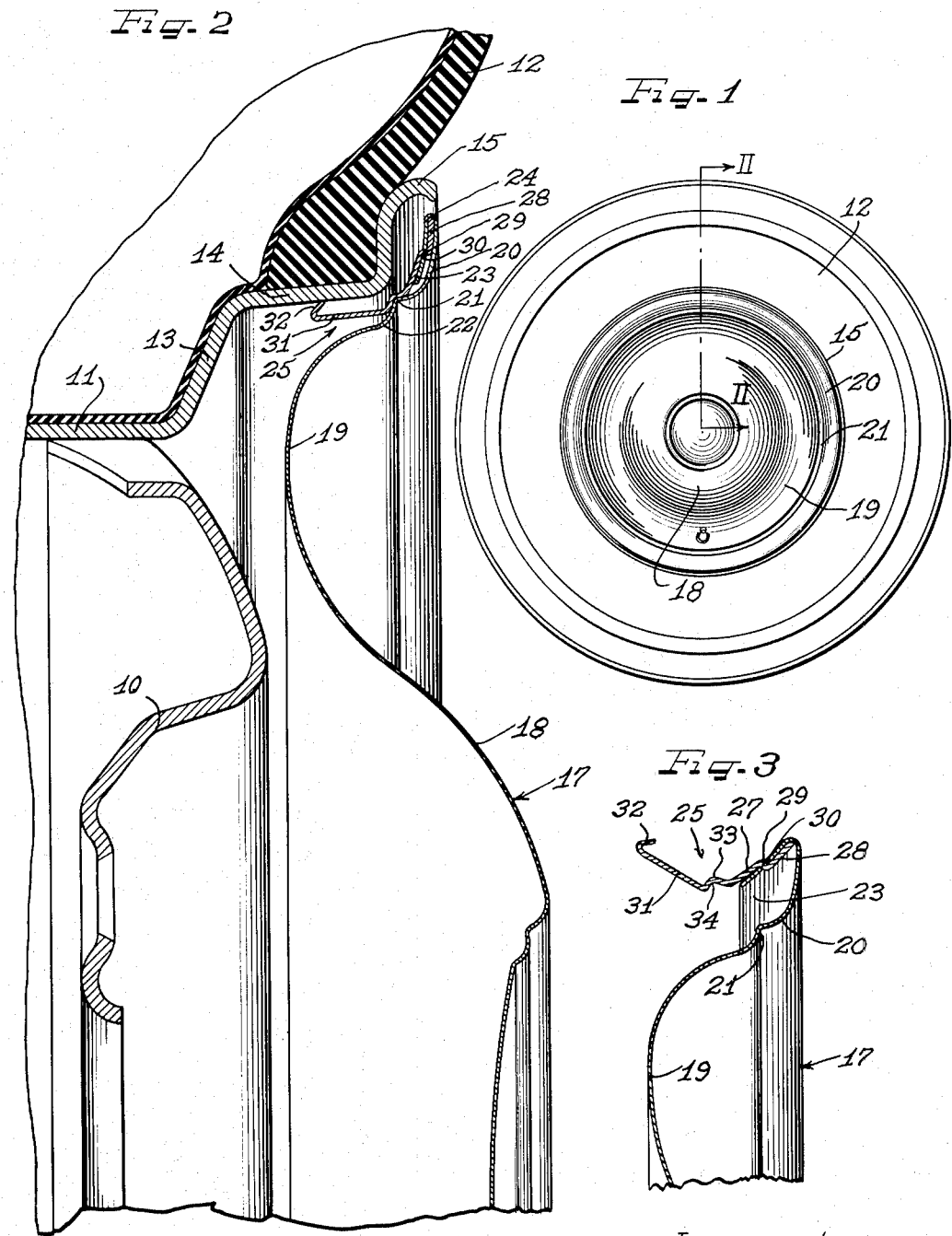

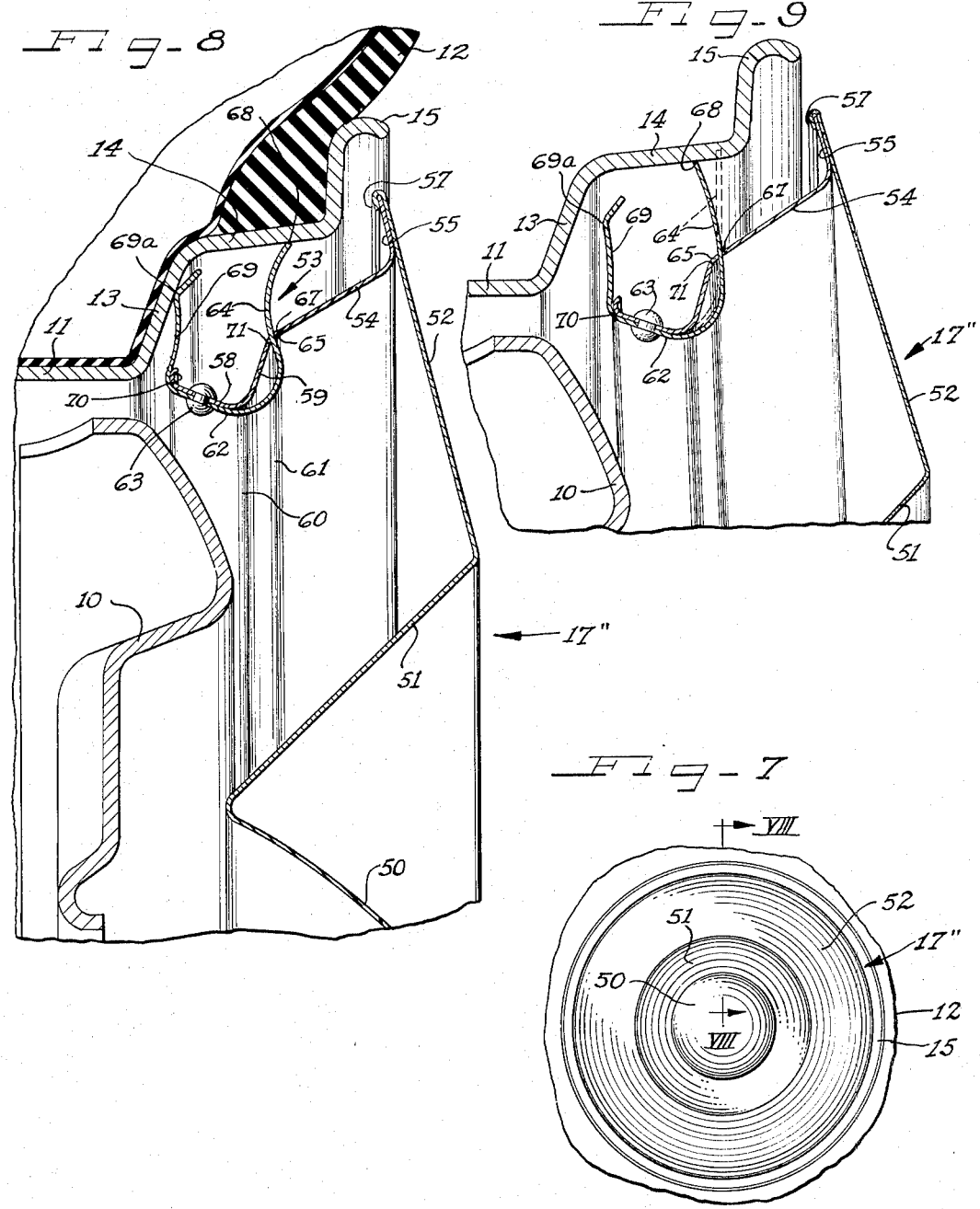

United States Patent Office 2,729,508
Patented Jan. 3, 1956

2,729,508

WHEEL COVER

George Albert Lyon, Detroit, Mich.

Application August 19, 1952, Serial No. 305,165

19 Claims. (Cl. 301—37)

The present invention relates to improvements in wheel structures and more particularly concerns novel means for protectively and ornamentally covering the outer side of a vehicle wheel.

An important object of the present invention is to provide an improved wheel structure having a novel cover disposed in ornamental, protective relation at the outer side thereof.

Another object of the invention is to provide an improved wheel cover for self-retaining disposition at the outer side of a vehicle wheel.

A further object of the invention is to provide an improved vehicle wheel cover having novel retaining means thereon for self-attachment to a vehicle wheel.

Still another object of the invention is to provide in a vehicle wheel structure improved retaining clip means for attachment of the wheel by engagement with the tire rim of the wheel.

According to the general features of the present invention there is provided in a wheel structure including a wheel body and a load-sustaining multi-flange tire rim, a cover for the outer side of the wheel including a circular cover member having therebehind a marginal flange, said flange having respective slots therein, and retaining clip members retainingly engaging said flange and extending through said slots and having retaining finger portions extending therefrom into retaining gripping relation to the tire rim.

According to other general features of the present invention there is provided in a cover for disposition at the outer side of a vehicle wheel including a multi-flange tire rim, the cover including a body portion having a margin including an underturned flange, and retaining clip means including a clip body having a plurality of retaining flanges interengaging with said underturned flange to retain the clip members on the flange, and retaining finger means projecting generally axially inwardly and including a retaining terminal for retaining gripping engagement with a flange of the tire rim of the wheel.

According to still further features of the invention the retaining clips and the body portion of the cover having interengaging structure disposed radially inwardly from the underturned flange of the wheel body and affording a stiffening backing for the retaining finger portions of the clips.

Other objects, features and advantages of the present invention will be readily apparent from the following detailed description of certain preferred embodiments thereof taken in conjunction with the accompanying drawings in which:

Figure 1 is a side elevational view of a vehicle wheel embodying a wheel cover according to the present invention;

Figure 2 is an enlarged radial sectional view taken substantially on line II—II of Figure 1;

Figure 3 is a radial sectional view through the cover taken substantially in the same plane as in Figure 2, but showing how one of the retaining finger clip members is assembled with the cover;

Figure 4 is a fragmentary rear elevational view of one margin of the cover showing one of the retaining clip members;

Figure 5 is a rear elevational view of the full cover;

Figure 6 is a radial sectional view through a modified form of cover showing the same applied to a wheel;

Figure 7 is a side elevational view of a wheel having thereon a modified form of the cover;

Figure 8 is an enlarged fragmentary radial sectional view taken substantially on the line VIII—VIII of Figure 7; and Figure 9 is a sectional view similar to Figure 8 but showing the cover thereof during pry-off.

As shown on the drawings:

The present invention concerns the protection and ornamentation of the outer side of vehicle wheels such as are currently in common use on automobiles and including a wheel body 10 and a tire rim 11 of the multi-flange, drop center type adapted to support a pneumatic tire and tube assembly 12. The tire rim includes a side flange 13, an intermediate generally axially outwardly extending flange 14 and a terminal flange 15.

Disposed in protective, concealing ornamental relation to the outer side of the wheel is a cover 17 which as shown may comprise a full disc formed from appropriate gauge sheet material such as stainless steel or chrome-plated material or other suitable sheet material finished in any desired fashion. The cover includes a crown portion 18, an intermediate portion 19 of concave cross-section and a marginal portion 20. Preferably, the marginal portion 20 is of generally convex cross-section joined to the intermediate portion 19 by a plurality of reinforcing ribs including a generally axially inwardly extending relatively sharp annular rib 21 and a convex generally axially outwardly extending inner rib 22. The marginal rib 20 is reinforced by an underturned marginal flange 23 which preferably lies in spaced relation therebehind and is joined thereto by a small radius radially outwardly extending juncture rib 24 which, as shown in Figure 2, lies on a diameter which is slightly less than the inner diameter of the tip of the terminal flange 15 so that in full assembly, the cover margin lies substantially at the plane of the tip of the terminal flange.

Means are provided for retaining the cover on the wheel, comprising a set of retaining clips 25 which are attached to the underturned flange 23. A plurality of the retaining clips 25 is provided as best seen in Figure 5, wherein six of the clips are shown, although any larger or smaller number may be used as desired. The retaining clips 25 are adapted to afford self-retaining engagement with the tire rim for the cover. To this end, each of the retaining clip members 25 comprises a relatively wide body portion 27 formed from appropriate gauge sheet metal such as spring steel and having along one edge a plurality of spaced cover-engaging retaining fingers 28 which are offset to one side of the plane of the body portion 27 a distance at least as great as the thickness of the underturned marginal flange 23 of the cover by means of an offsetting bend 29. By this construction, the retaining fingers 28 are adapted to be assembled with the flange 23 by inserting the fingers 28 through respective complementary slots 30 in the flange 23 and with the offsetting bends 29 extending through the slots generally normal to the plane of the flange 23.

To facilitate assembly of the clips with the flange 23, the flange is preferably initially disposed in a spread open condition as shown in Figure 3 so that the fingers 28 can be readily inserted endwise through the slots 30 and then tipped back against the inner face of the flange 23 after the offsetting bends 29 enter the slots 30. In this relationship, the body 27 of the clip lies against the outer face of the flange 23 radially inwardly from the slots 30. Thereupon the flange 23 is bent axially outwardly toward the marginal rib portion 20 of the cover and the clips are as a result locked against displacement from the flange 23 by clamping of the fingers 28 between the flange 23 and the marginal rib 20.

The body portion 27 of each of the clips 25 extends radially inwardly beyond the cover flange 23 and includes a retaining finger extension 31 which tapers to a short terminal flange 32 that extends in generally divergent angular relation to the body of the retaining finger extension. The construction and relationship of the retaining clips to the cover and to the tire rim 11 is preferably such that the retaining finger extensions 31 of the clips extend generally axially inwardly from the cover on a circumference of smaller diameter than the outer marginal portion of the intermediate flange 14 of the tire rim, but of larger diameter than the radially outer side of the intermediate portion 19 of the cover which is of substantially smaller diameter than the opposing intermediate flange of the tire rim so that the clip fingers extend down into the space between the tire rim intermediate flange 14 and the cover intermediate portion 19 substantially as seen in Figure 2. The retaining terminals 32 extend radially and axially outwardly and are quite short and stiff while the finger extension portions 31 are relatively long and afford a substantial degree of flexibility in the fingers.

In the unassembled condition of the cover, the tips of the retaining terminals extend to a slightly greater diameter than the inner surface of the intermediate flange 14. Hence, in applying the cover to the wheel by centering the same on the wheel and pressing the cover axially inward to cause the tips of the retaining terminal flanges 32 to cam both axially and radially inwardly along the inner face of the rim flange 14, the retaining finger portions 31 are placed under substantial resilient tension which reacts against the tips of the stiff terminal flanges 32 to drive the same into thorough retaining gripping engagement against the rim flange 14.

In order to enhance the resiliency of the retaining finger portions 31 of the clips, each of the clips preferably has at juncture of the retaining finger portion 31 with the body portion 27 a transverse rib 33 which affords a generally axially outwardly opening groove 34 nestingly receptive and seating against the reinforcing rib 21 of the cover. Thereby the clips are backed solidly against the cover and the retaining fingers 31 are substantially stiffened in their resiliency.

In the modification of Figure 6 the details of the wheel are the same as in Figure 2 and, therefore, similar reference numerals indicate correspondingly identical parts. However, the cover identified as 17' is of somewhat different form in that it is not of as great a diameter as the cover of Figure 2 and the outer margin of the cover in assembly with the wheel rests against the shoulder defined at juncture of the intermediate and terminal flanges of the tire rim. Accordingly, the cover 17' includes a crown portion 35, and an intermediate annular convex portion 37 and a marginal portion 38. The marginal portion 38 extends generally radially and axially outwardly substantially frusto-conically and has an underturned flange 39 extending generally radially and inwardly therebehind and formed with an inner angular terminal portion 40 which extends more sharply axially inwardly and lies opposite the adjacent outer margin of the intermediate cover portion 37.

The radially outer side of the intermediate cover portion 37 in assembly with the wheel lies in radially inwardly spaced relation to the intermediate tire rim flange 14 and there is thus provided a substantial space accommodating a set of retaining finger members 41, each of which includes a body portion 42 having retaining fingers 43 at one edge disposed angularly thereto and extending through appropriate slots 44 in the flange 39 adjacent juncture of the inner marginal portion 40 of the flange with the body of the flange. The body portions 42 of the clip members lie adjacent to and in backed-up relation to the flange marginal portion 40.

Extending from the body portion 42 of the clip member in each instance is a retaining finger extension 45 which extends generally axially inwardly at an angle to the body 42 and terminates in a divergent retaining terminal finger or flange 47 which is quite short and stiff and extends generally radially and axially outwardly into endwise retaining gripping engagement with the inner face of the intermediate flange 14 of the tire rim in the assembled relation of the cover to the wheel. The tips of the terminal flanges 47 in the unassembled condition of the wheel extend to a slightly greater diameter than the inner diameter of the outer portion of the intermediate flange 14 of the tire rim so that when the cover is applied by pressing the same inwardly into position on the wheel, the retaining terminal flanges 47 cam inwardly along the inner face of the tire rim flange and are deflected radially inwardly to place the retaining finger extensions 45 under resilient stress reacting against the tips of the terminal flanges to effect a strong gripping retaining engagement against the tire rim flange.

It will be understood that in the form of Figure 6, similarly as in the form of Figure 2, as shown in Figure 4, a plurality of retaining fingers 43 is provided. The fingers 43 are clamped between the flange 39 and the marginal portion 38 of the cover and effectively retain the retaining clip members 41 in place on the cover.

By having the cover 17 or 17', as the case may be, provided with separately formed retaining clip members, the cover proper can be made from relatively thin sheet material of possibly low inherent resiliency while the clip members can be made from a heavier gauge, spring steel material of substantial inherent resiliency. The retaining fingers retain the cover on the wheel in snap-on, pry-off relation and afford a substantially floating attachment of the cover in that the cover is capable of yielding radially in response to radial pressure thereon by reason of the resilience of the retaining clips and the disposition of the retaining clips within the space between the tire rim and the cover body affording clearance for a substantial range of flexing of the retaining clip fingers. Application of the cover is easily effected by simply pressing the same axially inwardly into place. Removal of the cover is easily effected by inserting a pry-off tool between the edge of the cover and tire rim and applying pry-off leverage to the margin of the cover which will cause the retaining clips to flex and to release the cover in response to the pry-off leverage. In view of the resilient flexibility of the retaining clips, pry-off does not damage the clips, but the cover can be removed and replaced an indefinite number of times at will.

The modification of Figures 7-9 provides a cover 17" applied to a wheel assembly the same as the wheel assembly of Figure 2 and accordingly similar reference numerals indicate identical parts of the wheel assembly.

The cover 17" comprises a cover body which is preferably formed from a single sheet of sheet material and drawn to provide a central inset but radially outwardly projecting crown 50 which merges with a radially and axially outwardly oblique intermediate portion 51 in turn merging with a radially outwardly and axially inwardly oblique marginal portion 52.

Means for retaining the cover 17" on the wheel comprise a plurality of retaining spring clips 53 carried by the cover behind the marginal portion 52. To this end, the cover is provided with a flange structure 54 which, as shown, comprises a separate ring member having a generally radially outwardly and axially inwardly oblique outer marginal flange 55 complementary to the back side of the margin portion 52 of the cover and clamped in assembly thereagainst by means such as an underturned edge finishing and reinforcing flange 57 on the cover periphery.

From the marginal flange 55, the flange ring member 54 extends obliquely axially and radially inwardly on a diameter substantially smaller than the diameter of the intermediate flange 14 of the wheel and is provided with an inner marginal clip supporting flange 58.

In the present instance, the clip supporting flange 58 extends generally axially and radially outwardly obliquely and is joined to the remainder of the flange ring 54 by an intermediate generally radially and axially outwardly oblique flange portion 59, thereby providing a pair of oppositely directed annular inner and outer reinforcing ribs 60 and 61 on the flange ring at juncture of the intermediate portion 59 with respectively the marginal flange portion 58 and the body portion of the retaining, clip supporting ring member 54.

In the present instance, each of the clip members 53 is constructed as a generally open loop structure from preferably spring steel. Each of the clip members 53 has an intermediate body portion 62 which is generally complementary to the inner side of the marginal flange 58 and is secured thereagainst as by means of a rivet 63. Arcuately from the outer end portion of the clip body 62 extends a spring retaining leg 64 which projects generally radially outwardly through a slot 65 in the flange ring 54 preferably provided substantially at juncture of the intermediate portion 59 of the ring member with the body of the ring member. Before the cover is applied to the wheel, the retaining clip leg 64 projects fairly straight outwardly beyond the slot 65 and may rest against a shoulder 67 defining the axially outer side of the slot, substantially as shown in dash outline in Figure 9.

In applying the cover to the wheel, the outer end portions of the clip legs 64 are applied against the juncture of the intermediate flange 14 and the terminal flange 15 of the tire rim and the cover pressed axially inwardly. This causes the clip legs 64 to flex into inwardly bowed condition by reason of the clip legs extending to a greater diameter than the inside diameter of the intermediate flange of the tire rim. Continuing axially inward pressure on the cover causes retaining tips 68 on the clip legs 64 to cam axially inwardly slidably along the inner face of the intermediate flange 14, and as the intermediate flange diminishes in diameter progressively axially inwardly, the clip legs 64 assume a more bowed, tensioned shape and the arcuate inner portions of the clip legs flex somewhat radially inwardly to increase the axially outward tension of the clip legs to drive the retaining tips 68 of the clip legs into retaining, biting, wedging engagement against the intermediate flange 14. During the inward pressing of the cover, the shoulders 67 press against the clip legs 64.

By preference, means are provided for holding the cover in spaced relation to the wheel at all parts including the tire rim. To this end, the inner end portions of the clips 53 are respectively provided with resilient stop legs 69 extending generally radially outwardly and having adjacent to their radially outer ends generally axially inwardly directed respective abutment shoulders 69a engageable under resilient tension against the side flange 13 of the tire rim. Normally the clip legs 69 are biased inwardly as shown in Figure 9, but as the cover is pressed home on the wheel, the clip legs engage against the side flange 13 of the tire rim and are flexed axially outwardly as shown in Figure 8, thus creating a generally axially outward pressure axially inwardly from the retaining legs 64 and improving the resilient tension of the retaining legs against the tire rim. The resilient tensioning of the legs 69 is improved by providing the inner terminus of the flange member 54 with a short stiff reinforcing and backup flange 70 engageable with the tensioning and stop legs 69 when the latter are under flexure from engagement with the tire rim. It will also be observed in Figure 8 that due to the axially outward tension imposed by the flexed stop legs 69, the retaining legs 64 of the clips are intermediately engaged by respective shoulders 71 at the axially inner sides of the slots 65. This applies a shortened leverage stiffening pressure against the clip legs 64, which improves the retaining, gripping engagement of the legs against the intermediate flange 14 of the tire rim.

By having the cover 17" in fully spaced relation to all parts of the wheel, it is in floating relation both axially inwardly and radially, while nevertheless being held against undesirable vibration by reason of highly tensioned retaining engagement effected by the clips 53. It will be understood that clips 53 are disposed in a peripheral series of as large a number as desired for the particular size of wheel to which the cover is to be applied. The spaced relation of the cover to the tire rim is also desirable for enabling circulation of air behind the margin of the cover in the gap provided between the tire rim and the cover margin and the flange ring 54 and through the usual openings provided between the wheel body 10 and the base flange 11 of the tire rim.

In order to remove the cover 17" from the wheel, a pry-off tool is inserted between the terminal flange 15 and the outer edge of the cover and levered against the underturned flange 57 until the legs 64 of the immediately adjacent clips are flexed to turn inside out as shown in full line in Figure 9 so that the tips 68 will turn from a generally axially and radially outward biting engagement with the intermediate flange 14 to a generally radially outwardly and axially inward direction so that they can slide axially outwardly along the intermediate flange 14 for releasing the cover. Pry-off force may have to be applied progressively at adjacent peripheral points on the cover margin, but generally a single pry-off force application will turn a sufficient number of the adjacent clip legs 64 upon themselves to release the cover. During the pry-off, the shoulders 71 engage the clip legs 64 intermediately and assist in forcing the clip legs to snap into the outwardly bowed condition shown in Figure 9.

The present case is a continuation-in-part of my copending application Serial No. 135,470, filed December 28, 1949, now abandoned.

It will be understood that modifications and variations may be effected without departing from the scope of the novel concepts of the present invention.

I claim as my invention:

1. In a wheel structure including a load sustaining wheel body and a multi-flange tire rim including a generally axially extending flange, a cover for the outer side of the wheel including a circular cover member having a marginal flange, said flange having respective slots therein, and resilient retaining clip members retainingly engaging in said slots and having retaining finger portions extending therefrom and including generally radially and axially outwardly inclined short and stiff terminal flanges having tip edges resiliently tensioned into retaining gripping relation to the tire rim.

2. In a cover for disposition at the outer side of a vehicle wheel including a multi-flange tire rim, the cover including a body portion having a margin including a flange, and retaining clip means including a clip body having a plurality of retaining flanges interengaging with said flanges to retain the clip members on the flange and retaining finger means projecting generally axially inwardly and including a retaining terminal for retaining gripping engagement with a flange of the tire rim of the wheel, the retaining clips and the body portion of the cover having interengaging structure disposed radially inwardly from the flange of the cover body and affording a stiffening backing for the retaining finger portions of the clips.

3. In a cover for disposition at the outer side of a vehicle wheel, a marginal structure on said cover including a plurality of aligned spaced slots, and a retaining clip including a body having a plurality of retaining fingers corresponding to the slots and interengaged through the slots, the opposite portion of the body having a retaining finger extension including a retaining terminal portion engageable with a portion of a vehicle wheel with which the cover is assembled.

4. A cover for disposition at the outer side of a vehicle wheel, a cover body having a marginal portion including an underturned flange, said flange having an aperture therein, and a retaining clip member having a body formed with a retaining finger extension projected through said aperture and clamped between said flange and the marginal portion of the cover, the opposite portion of the clip body having a retaining finger extension including a portion engageable with a portion of a vehicle wheel to retain the cover on the wheel.

5. A cover for disposition at the outer side of a vehicle wheel, a cover body having a marginal portion including an underturned flange, said flange having an aperture therein, and a retaining clip member having a body formed with a retaining finger extension projected through said aperture and clamped between said flange and the marginal portion of the cover, the opposite portion of the clip body having a retaining finger extension including a portion engageable with a portion of a vehicle wheel to retain the cover on the wheel, an intermediate portion of the clip between said body and said extension thereof bearing against and being backed up by a portion of the cover inwardly from said underturned flange.

6. In a cover for disposition at the outer side of a vehicle wheel, a cover body having an underturned margin, said margin having a slot therein, and a cover retaining clip having a finger extending through said slot and projecting endwise toward the juncture between said underturned flange and the cover marginal portion and being clamped between the cover marginal portion and the underturned flange, a portion of the clip body at the side of the slot remote from the juncture of the underturned flange with the cover margin opposing a portion of the clip body, the clip body at the side thereof remote from said finger having a retaining extension projecting beyond the edge of the flange and being adapted to engage retainingly with a portion of a wheel against which the cover is applied.

7. In a cover for disposition at the outer side of a vehicle wheel, a cover body having a marginal portion and a generally axially inwardly extending annular rib at juncture of said marginal portion and the cover body, said marginal portion having at its outer side an underturned flange extending a substantial extent in a generally radial direction therebehind, said flange having a slot therein, and a retaining clip having a body lying against said flange and formed with an attachment finger extending through said slot and clamped in place between the flange and the marginal portion of the cover, said clip body having a grooved portion nestingly interengaged with said rib and also having a retaining extension extending divergently relative to the adjacent portion of the cover body and angularly relative to said clip body and engageable retainingly with a portion of the wheel to which the cover is applied.

8. In a wheel structure including a wheel body and a multi-flange tire rim, a wheel cover for substantially concealing the outer side of the wheel inclusive of the tire rim and having a marginal portion lying opposite the tire rim, said marginal portion having an underturned flange, said underturned flange having a slot therein, and a retaining clip member having a finger extending in one direction therefrom and engaged through said slot and clamped between the marginal portion of the cover and said flange and a retaining finger extension projecting therefrom divergently relative to the cover and in spaced relation to the cover and a flange of the tire rim and engaging the tire rim flange in resilient, retaining, gripping relation.

9. In a wheel structure including a wheel body and a multi-flange tire rim, a wheel cover for substantially concealing the outer side of the wheel inclusive of the tire rim and having a marginal portion lying opposite the tire rim, said marginal portion having an underturned flange, said underturned flange having a slot therein, and a retaining clip member having a finger extending in one direction therefrom and engaged through said slot and clamped between the marginal portion of the cover and said flange and a retaining finger extension projecting therefrom divergently relative to the cover and in spaced relation to the cover and a flange of the tire rim and engaging the tire rim flange in resilient, retaining, gripping relation, the underturned flange radially outwardly of the slot bearing against the tire rim flange to determine the axially inwardly disposition of the cover on the wheel.

10. In a cover for disposition at the outer side of a vehicle wheel, a circular cover body having an underturned marginal flange in substantially return bent relation behind the cover body and lying closely adjacent thereto, and a plurality of separately formed cover-retaining spring clips having portions thereof extending through and interlocked with said flange between the flange and the cover body and other portions projecting from said flange for retaining engagement with a portion of a wheel to which the cover is applied.

11. In a cover for disposition at the outer side of a vehicle wheel, a cover body having an underturned marginal flange, and a plurality of spaced retaining elements extending in fixed relation from said flange and each having a shoulder portion backed against the back side of the cover body spaced from said flange, each of said elements having a resilient radially flexible body portion of substantial width and length extending generally axially away from said cover back side, said body portion of each element terminating in a divergent retaining terminal retainingly engageable with an opposing flange structure of a wheel.

12. A cover for disposition at the outer side of a vehicle wheel, said cover comprising a cover body having an outer marginal portion provided with a plurality of cover retaining clips, said clips having a portion secured to said cover portion and a resilient leg extending from said clip portion for retaining engagement at the ends of said legs with a part of a vehicle wheel, said cover portion having a turned radially outer extremity and a shoulder spaced substantially radially inwardly from said extremity engageable with an intermediate opposing portion of the clip leg for shortening the flexure leverage of the leg.

13. A cover for disposition at the outer side of a vehicle wheel, said cover comprising a cover body having an outer marginal portion provided with a plurality of cover retaining clips, said clips having a portion secured to said cover portion and a resilient leg extending from said clip portion for retaining engagement at the ends of said legs with a part of a vehicle wheel, said cover portion having a turned radially outer extremity and a shoulder spaced substantially radially inwardly from said extremity engageable with an intermediate opposing portion of the clip leg for shortening the flexure leverage of the leg, said portion of the cover comprising a generally axially inwardly extending flange carrying said clips.

14. In a cover for disposition at the outer side of a vehicle wheel, a cover body, a flange behind said cover body, said flange having a clip secured thereto, said clip having a resilient retaining leg, said retaining leg extending through an aperture in the flange and projecting beyond the flange for retaining engagement with a part of a vehicle wheel, said clip having a second leg extending beyond the flange and in spaced relation to said retaining leg and engageable with another part of the wheel for defining a limit upon movement of the cover in one direction on the wheel.

15. A cover for disposition at the outer side of a vehicle wheel, said cover comprising a cover body having therebehind a generally axially extending marginal flange, said flange having an aperture therein spaced from its axially inner end, a resilient retaining clip secured to the radially inner side of said flange between said aperture and said inner end, said clip having a spring leg projecting therefrom through said aperture and generally radially outwardly for engagement with a flange of a tire rim, said aperture being substantially wider than said clip leg so that the clip leg can move flexibly axially within said aperture, the axially outer and axially inner side of the apertures being defined by shoulders opposing and engageable by the flexible clip leg in its respective opposite flexure limits.

16. In a wheel structure including a wheel body and a tire rim having a generally axially extending intermediate flange and a terminal flange at the outer side of said intermediate flange and extending generally radially therefrom, a cover for disposition at the outer side of the wheel comprising a cover body having an outer marginal portion extending in overlying relation to the terminal flange and directed generally radially and axially inwardly in spaced relation to the intermediate flange, and a plurality of separately formed cover retaining clips each of which has a portion secured to said cover portion and a resilient leg extending therefrom for engagement of a terminal tip edge with said intermediate flange for retaining the cover in place, said cover portion having a turned radially outer extremity part and a shoulder spaced radially inwardly from said extremity part engageable with an intermediate opposing portion of the clip legs for shortening the flexure leverage of the legs.

17. In a cover for disposition at the outer side of a vehicle wheel including a generally radially facing flange portion, the cover including a body portion having a margin including an annular flange therebehind and extending inwardly therefrom, and retaining clip means including a clip body of sheet metal having a plurality of flanges interengaging with said annular flange to retain the clips in predetermined assembled and operative relation to the flange, and retaining finger means projecting from one end of the clip body and including a retaining terminal for retaining gripping engagement with the flange portion of the wheel.

18. In a wheel structure including a multi-flange tire rim having an axially outwardly facing side flange and axially outwardly therefrom a generally radially inwardly facing flange, a cover for disposition at the outer side of the wheel in overlying relation to said tire rim flanges and including a portion behind the cover to lie in adjacent spaced relation to said radially facing tire rim flange, said portion having thereon a retaining clip including a resiliently flexible leg having a retaining trip edge retainingly engageable with said radially facing tire rim flange intermediate the axially inner and outer limits thereof, said cover portion having a shoulder intermediately engageable with said clip leg to reduce the flexible leverage thereof and increase the resilient retaining engagement tension of the leg directed toward said retaining tip edge.

19. In a cover for disposition at the outer side of a vehicle wheel, said cover comprising a member having an annular flange structure therebehind, said flange structure having on the radially inner side thereof a series of retaining spring finger members, said flange structure having respective apertures therethrough and said retaining spring finger members having resilient legs projecting through said apertures and engageable retainingly with a part of a wheel to which the cover may be applied, said retaining finger members having stop leg extensions projecting generally axially inwardly beyond said flange structure for engagement with a part of the wheel to limit axial inward movement of the cover toward the wheel.

References Cited in the file of this patent

UNITED STATES PATENTS

| | | |
|---|---|---|
| 2,002,872 | Sinclair | May 28, 1935 |
| 2,174,087 | Horn | Sept. 26, 1939 |